United States Patent [19]
Dosch et al.

[11] 3,743,907
[45] July 3, 1973

[54] SPEED CONTROL OF ELECTRICAL MOTORS

[76] Inventors: Peter Dosch, 15 Rankstrasse, Jona, Switzerland; Manfred Oehmann, AM Waldrand 24, D-69 Heidelberg-Boxberg; Emil Benz, Blieskastellerstrasse 42, D-6651 Blickweiler, both of Germany

[22] Filed: May 10, 1971

[21] Appl. No.: 141,965

Related U.S. Application Data

[63] Continuation-in-part of Ser. No. 126,900, March 22, 1971, abandoned, which is a continuation of Ser. No. 795,292, Jan. 30, 1969.

[30] Foreign Application Priority Data

Feb. 1. 1968   Switzerland..................1570/68

[52] U.S. Cl................... 318/271, 318/327, 318/391
[51] Int. Cl. ............................................. H02p 5/16
[58] Field of Search................... 318/326, 327, 328, 318/345, 391, 430, 431, 271, 276

[56] References Cited
UNITED STATES PATENTS

| | | | |
|---|---|---|---|
| 3,488,571 | 1/1970 | Tamaki | 318/328 |
| 3,177,417 | 4/1965 | Wright | 318/345 |
| 3,593,075 | 7/1971 | Pantelakis | 318/391 |
| 3,601,673 | 8/1971 | Mason | 318/345 |
| 3,617,844 | 1/1971 | Grygera | 318/327 |
| 3,553,556 | 1/1971 | Dosch | 318/327 |

*Primary Examiner*—Bernard A. Gilheany
*Assistant Examiner*—Thomas Langer
*Attorney*—Raymond J. McElhannon, John Thomas Cella et al.

[57] ABSTRACT

Circuit arrangements for applying an increasing voltage to a motor with increasing motor speed in a lower speed range and for applying a decreasing voltage to a motor with increasing motor speed in a higher speed range both to obtain proper regulation of the motor while avoiding overheating in startup and overload conditions and to adapt said motor in the startup condition to loads having variable speed-torque requirements.

12 Claims, 12 Drawing Figures

INVENTORS
PETER DOSCH
MANFRED OEHMAN
BY EMIL BENZ
ATTORNEYS

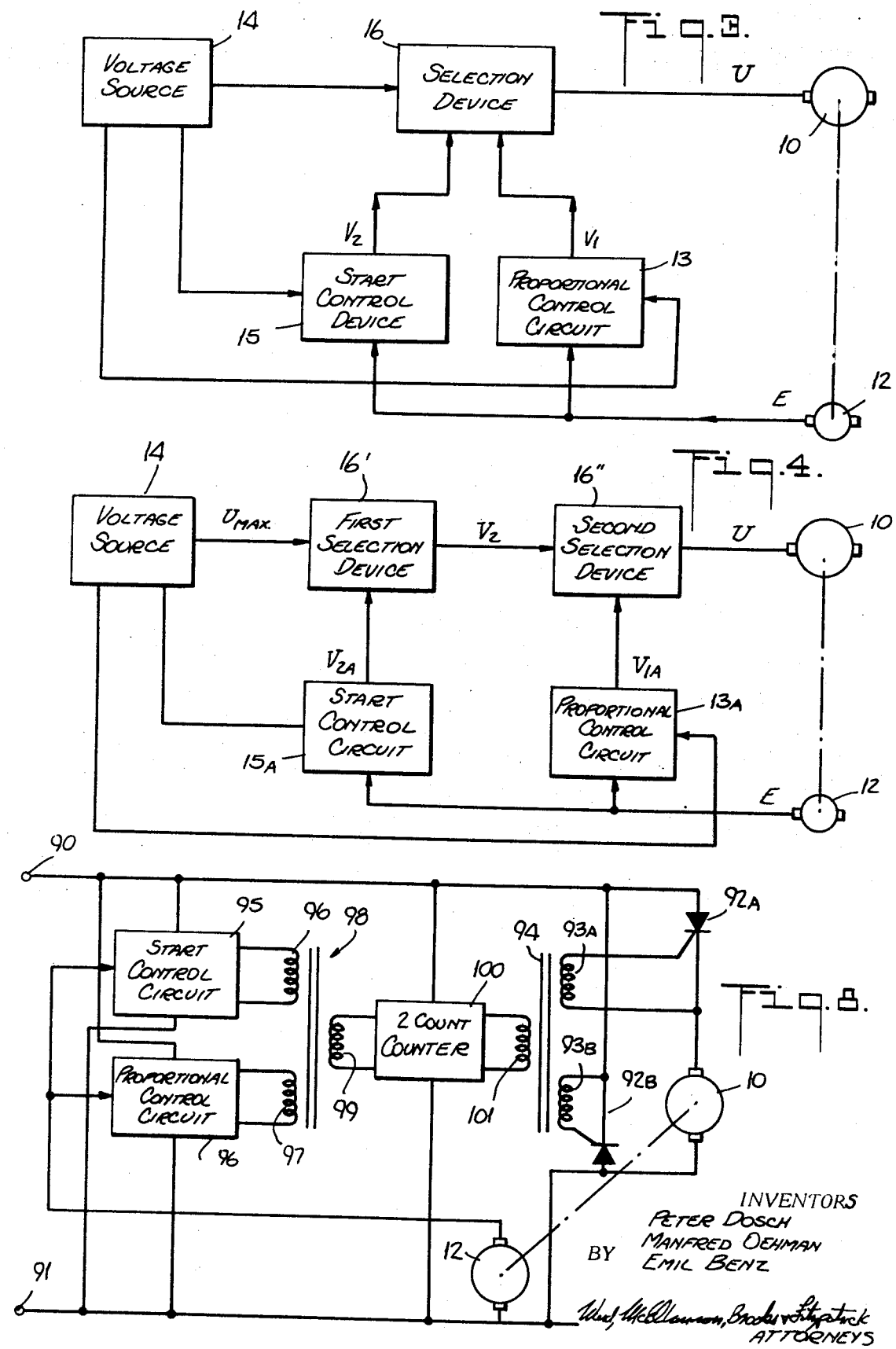

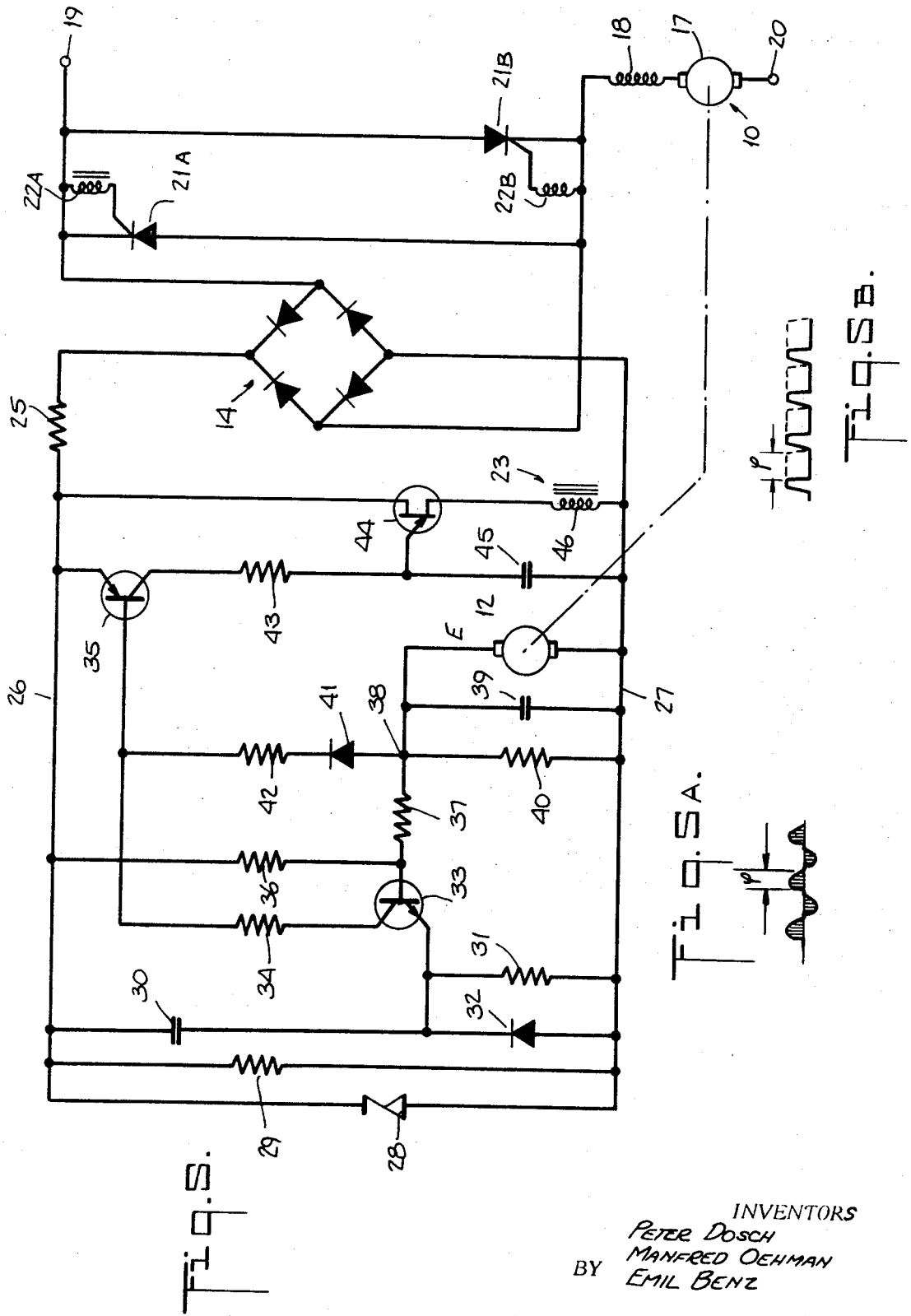

INVENTORS
PETER DOSCH
MANFRED OEHMAN
EMIL BENZ

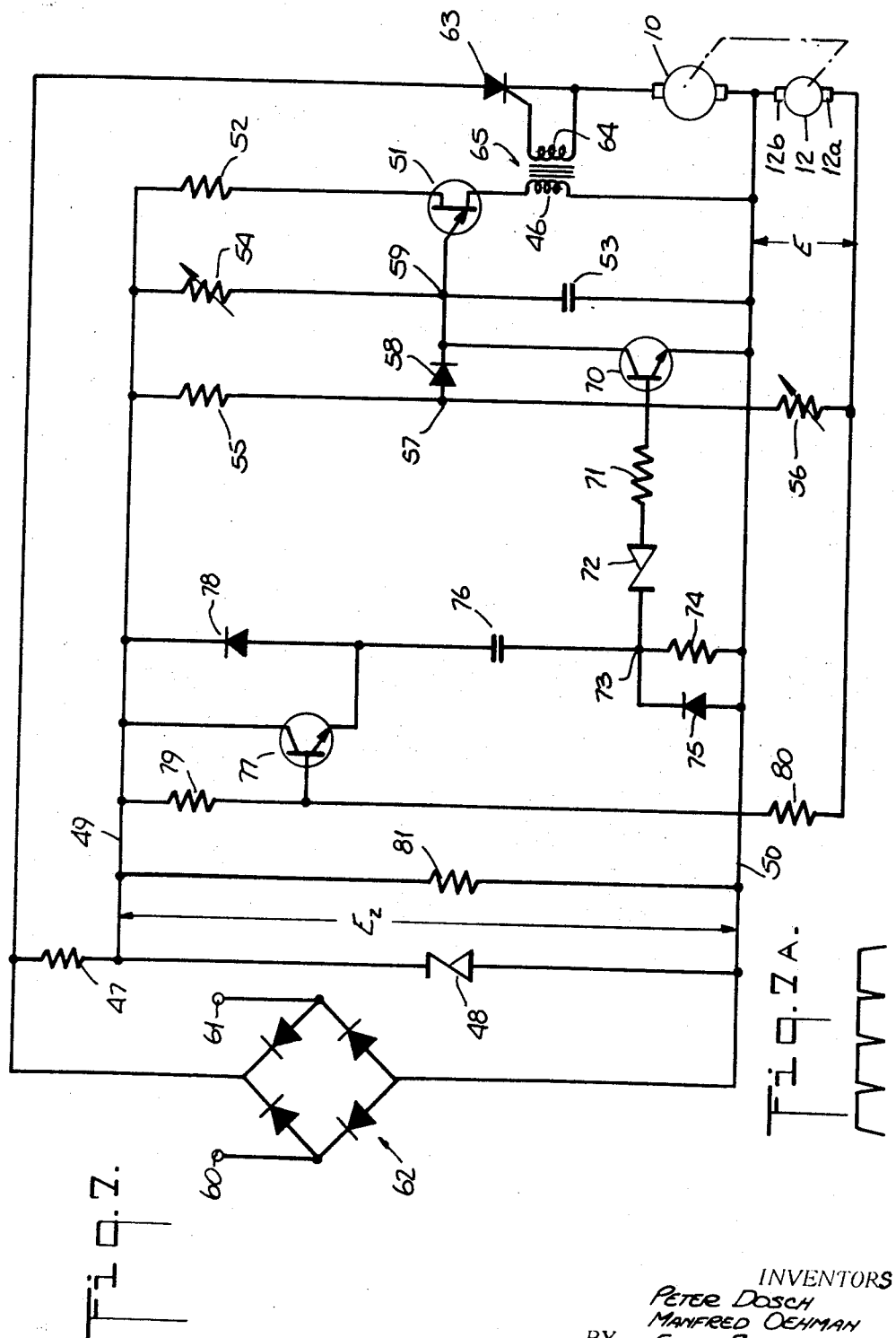

SPEED CONTROL OF ELECTRICAL MOTORS

This application is a continuation-in-part application of U.S. Pat. application Ser. No. 126,900, filed Mar. 22, 1971, now abandoned, which in turn is a continuation of U.S. Pat. application Ser. No. 795,292, filed Jan. 30, 1969.

This invention relates to the control of electrical motors and more particularly, it concerns novel arrangements for regulating the speed of electrical motors and for controlling the voltages applied to such motors at different speeds.

The present invention relates to motor systems wherein there is derived a control voltage which is based upon the rotational speed of an electrical motor and which is utilized to control the voltage applied to the motor within a given speed range in such manner that should the motor speed increase, the applied voltage will decrease in an approximately linear manner from a maximum to a minimum value.

In general, the speed of electrical motors has been controlled in many prior art arrangements by adjusting the voltage applied to the motor in accordance with a control signal which varies with the rotational speed of the motor. In such cases, when the motor speed falls below a predetermined level, a maximum voltage is applied to the motor; and when, on the other hand, the rotational speed of the motor exceeds a predetermined level, a minimum voltage is applied to the motor. The control circuits which operate in this manner are generally designated as "proportional control devices." The motor speed variation between the speeds at which maximum and minimum voltages are applied is usually referred to as the "proportionality range." Various circuit arrangements may be employed for achieving motor control in this way; however, they form no part of the present invention and will not be discussed herein.

A major disadvantage of the above described motor control arrangements lies in the fact that no matter how far below the designated minimum motor speed the actual speed of the motor falls, the same maximum voltage is applied to the motor. Thus, the same maximum voltage is applied to the motor both during its initial startup and during periods of overload. This situation not only causes very intense currents to flow through the motor thereby causing the motor to become unduly overheated when frequently started or overloaded, but also fails to consider the regulation or adaptation of the motor to the variation of moment or torque of the motor load at speeds below the designated minimum motor speed.

In order to avoid overheating, various current limiting control circuits have been provided so as additionally to influence the motor voltage in accordance with the amount of current flowing through the motor. However, these current limiting circuits fail to consider or take into account the variation of moment or torque requirement of the motor load at speeds below the designated minimum motor speed. In addition, in many instances, these current limiting control circuits depend upon some means for measuring the current actually flowing through the motor. These current measuring devices are often quite expensive and in some cases cause power losses by draining excess current from the motor. In addition, motor arrangements utilizing duty cycle or "phase-splitting" type control wherein the voltage applied to a motor, and therefore the current flowing through it, are dependent upon the point at which the motor circuit is closed during the application of an alternating voltage to it. Other difficulties arise in that the current limiting circuits cannot act upon the applied voltage until after the current to be controlled has been measured. This then requires delay circuits between the measurement point and the control point of the power transmission path to the motor. These delay circuits, however, deleteriously affect the response characteristics of the motor control arrangement, thereby affecting precision of control. The same disadvantage also occurs in conventional start current suppression circuits which utilize retardation or delay arrangements.

The present invention overcomes the above discussed disadvantages and provides novel motor control arrangements wherein the voltage applied to the motor is controlled not only in the vicinity of its desired speed, but also in the start and overload speed ranges by a control voltage derived from the actual speed of the motor. In the start and overload ranges, this control voltage not only adapts the speed-torque characteristics of the motor to its load requirements, but also limits the amount of current instantaneously applied to the motor so as to prevent the flow of intense currents through the motor and thus prevent overheating.

Specific embodiments of the invention have been chosen for purposes of illustration and description, and are shown in the accompanying drawings, forming a part of the specification wherein:

FIG. 3 is a block diagram illustrating an overall control arrangement according to the present invention;

FIG. 4 is a block diagram illustrating a modified arrangement for controlling a motor according to the present invention;

FIG. 5 is a circuit diagram of one control arrangement embodying the present invention;

FIGS. 5A and 5B are waveforms illustrating voltage variations at different points in the circuit of FIG. 5;

FIG. 7 is a circuit diagram of a further embodiment of the present invention;

FIG. 7A is a waveform illustrating voltage variations at one point in the circuit of FIG. 7;

FIG. 8 is a schematic illustrating another modification of the system of the present invention.

Figure 1:
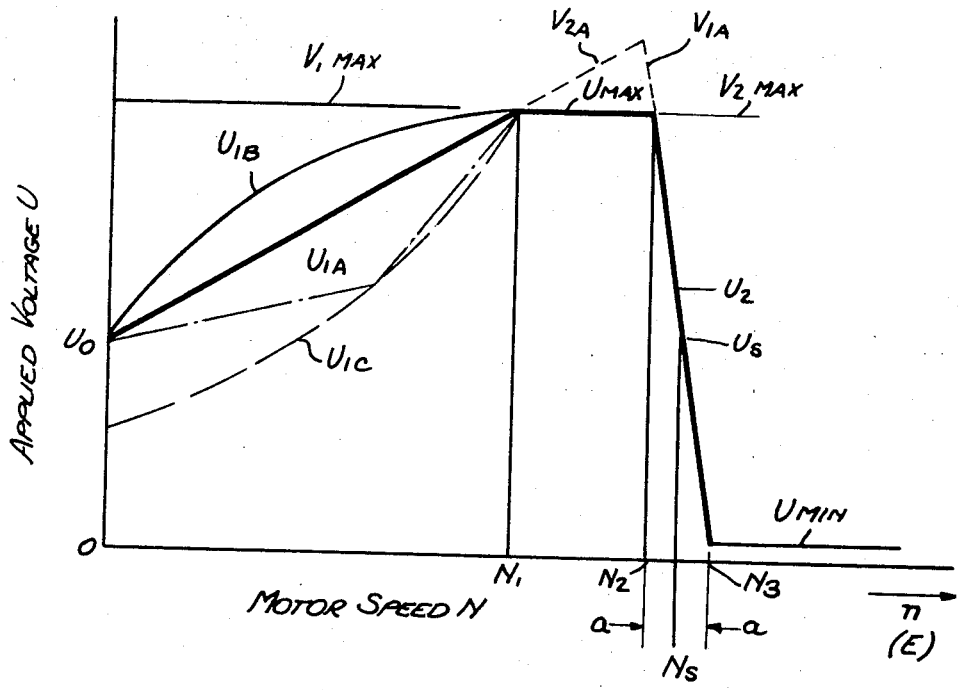
FIG. 1 is a graph illustrating the voltage speed relationships used in controlling the motor in accordance with the present invention.

The control arrangements of the present invention operate to control the rotational speed of a DC electric motor such that, as shown in FIG. 1, a control voltage $U$, which is applied to the motor, increases in a starting speed range $0-N_1$, from an initial value, $U_o$ to a maximum voltage, $U_{max}$. Thereafter, in an intermediate speed range $N_1-N_2$, the applied voltage to the motor remains constant at the value $U_{max}$. Finally, in a nearby controlled speed range $N_2-N_3$, the voltage applied to the motor decreases according to a straight line $U_2$ to a minimum value $U_{min}$, which for most purposes will be approximately zero.

Somewhat toward the middle of the speed control range $N_2-N_3$, there is established a desired rotational speed $N_s$ which the motor is to maintain. It can be seen that, when the motor speed N becomes higher or lower than $N_s$ within the control range $N_2-N_3$, the voltage $U_2$ applied to the motor becomes, respectively, lower or higher than the voltage $U_s$ corresponding to $N_s$. Accordingly, the motor speed again becomes lower or higher; and is therefore maintained close to the desired value $N_s$.

In accordance with the present invention, in at least the starting speed range $0-N_1$, the speed-torque characteristics of the DC motor is adapted or matched to the particular motor load. This adaptation is realized by controlling the motor with a control voltage U which varies in amplitude as a function of motor speed, such as to cause the motor to respond with the desired speed-torque characteristics.

Figure 2:
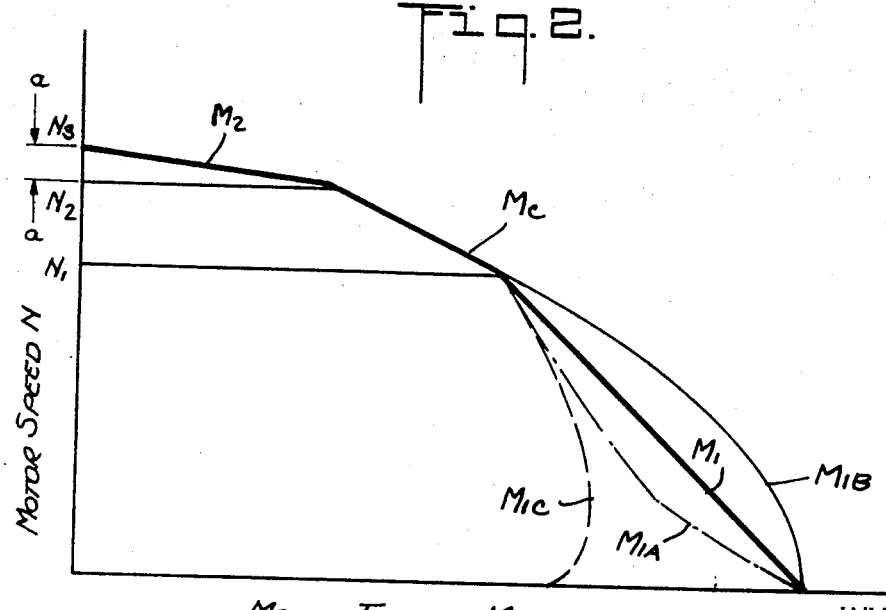
FIG. 2 is a graph illustrating motor speed-torque relationships utilized in controlling a motor and its load in accordance with the present invention.

Referring to FIG. 2, there is shown in solid line the speed-torque characteristics M of a DC motor suitable for driving a load whose torque requirement in the starting speed range $0-N_1$ increases in an approximately linear manner with decreasing motor speed. As shown in FIG. 1, the speed torque characteristics M is realized by controlling the DC motor with a control voltage U comprised of the voltages $U_1$, $U_{max}$ and $U_2$ in, respectively, the starting speed range $0-N_1$, the intermediate speed range $N_1-N_2$, and the controlled speed range $N_2-N_3$. Thus, it will be appreciated that in the controlled speed range $N_2-N_3$, the motor torque M decreases linearly with an increase in motor speed according to the line designated $M_2$. In the intermediate speed range $N_1-N_2$ the torque M, follows the usual motor torque characteristic for constant applied voltages, which, in a direct current series connected motor, approximates the line designated $M_C$. In the starting speed range $0-N_1$, the torque $M_1$ increases in an approximately linear manner with decreasing motor speed and thus in this speed range is adapted to the motor load.

Since in the starting speed range $0-N_1$, the applied control voltage $U_1$ increases linearly with the speed of the motor, intense starting currents are prevented to flow through the motor and cause overheating.

In both FIGS. 1 and 2 the control speed range $N_2-N_3$ is indicated by arrows a—a.

The speed-torque characteristics of the DC motor can be adapted or matched to other load requirements. For example, air circulators, which in the starting speed range require a torque which increases in square proportion to the speed of the motor, can be driven with constant acceleration in the starting speed range $0-N_1$ by controlling a DC motor with a control voltage U having, in the starting speed range, a speed voltage characteristics of the curve $U_{1C}$ or the series of straight line segments $U_{1A}$ shown in FIG. 1. Flymasses or flywheels, which require a large amount of torque during start up, but a small torque at controlled speed, can be efficiently driven by a D.C. motor controlled by a control voltage U having, in the starting speed range $0-N_1$ a speed-voltage characteristics of curve $V_{1B}$ shown in FIG. 1.

For each of the described load requirements, the control voltage U, during the starting speed range $0-N_1$ is limited and thus intense starting currents are prevented and the motor is protected from overheating.

In other variations it is possible to adjust or regulate the desired rotational speed $N_S$. In fact, the entire controlled speed range $N_2-N_3$ may be shifted along the N axis. Thus, it may occur that for certain adjustments of this range, the intermediate speed range $N_1-N_2$ will disappear entirely and the controlled speed range will immediately follow the starting speed range. This situation may also occur even in circuits where the speed range $N_2-N_3$ is not in fact adjustable.

Where the motor to be controlled is a direct current motor and is supplied with alternating current which is regulated on a duty cycle basis, the "motor voltage" is considered to be the average value of the portion of the alternating voltage supplied to the motor during the single half-wave periods of the alternating current supply. During each half-period (or in every second half-period, depending upon the type of rectification employed), the alternating voltage is applied to the motor only during a certain phase angle, referred to as the "current flow angle." This current flow angle may be controlled and the applied motor voltage U increased as the current flow angle increases. Thus, in a generally qualitative sense, in the diagram of FIG. 1 the current flow angle ($\phi$) may be considered to be represented on the ordinate axis.

Referring now to FIG. 3, there is indicated a motor 10 to be controlled. This motor may be, for example, a series connected motor. The motor 10 is arranged to drive a tachometer generator 12 which produces a voltage E proportional to its rotational speed N. The voltage E is supplied to a proportional control circuit 13 of a known type. The proportional control circuit 13 is supplied with current from a voltage source 14 and produces an output voltage of $V_1$ corresponding to the proportional voltage E and the current from the voltage source 14. The voltage $V_1$ produced by the proportional control circuit 13 varies linearly in accordance with variations in the voltage E over a certain range thereof, namely the range corresponding to the rotational speeds $N_2-N_3$. The proportional control circuit 13 is constructed and arranged such that in this speed range the voltage $V_1$ will follow the course $U_2$ of FIG. 1. However, in the speed range between 0 and $N_2$ the voltage $V_1$ remains at a constant maximum value $V_{1max}$, which is the same as $U_{max}$. In the arrangement of FIG. 3 there is also provided a start control device 15 which is controlled by the voltage E produced by the tachometer generator 12. The start control device 15 is constructed and arranged so that it will produce an upward voltage $V_2$ which, in the starting speed range $0-N_1$, will follow the required path, e.g. $U_1$, $U_{1A}$, $U_{1B}$ and $U_{1C}$ in FIG. 1, to adapt the motor to its load (not shown); and beyond the speed $N_1$ it will remain at a constant value $V_{2max}$, which is approximately the same as $U_{max}$. The voltage $V_2$ from the start control device 15 and the voltage $V_1$ from the proportional control circuit 13 are both applied to a selection device 16 which in turn is constructed and arranged such that it will detect the smaller of the two voltages and apply only the smaller voltage to the motor 10 at any instant. Thus, in the starting speed range, the voltage $V_2$ produced by thethe start control device 15 is smaller than the voltage $V_{1max}$ being produced by the proportional control circuit 13. Therefore, in this speed range the smaller of these two voltages, $V_2$, is applied to the motor 1. Thereafter, in the intermediate speed range, both of the voltages $V_2$ and $V_1$ are at the same magnitude and either may be applied to the motor. Finally, in the speed control range $N_2-N_3$, the voltage $V_1$ produced by the proportional control device 13 is applied to the motor so as to control its speed in the usual manner.

FIG. 4 illustrates a variation of the system shown in FIG. 3. In FIG. 4, there is shown a proportional control circuit $13_A$ which is constructed and arranged to produce a voltage $V_{1A}$ which in the speed control range $N_2-N_3$ follows the course of line $U_2$. The voltage $V_{1A}$ follows the same path in the range below the speed $N_2$ as illustrated by the dashed line in FIG. 1. In addition, there is provided a start control device $15_A$ which is constructed and arranged to produce a voltage $V_{2A}$ which in the start range $N_0-N_1$ follows the required course, e.g., $U_1$, $U_{1A}$, $U_{1B}$ and $U_{1C}$ in FIG. 1, to adapt the motor 10 to its load; and then beyond the speed $N_1$, it continues in the direction as indicated in the dashed line $V_{2A}$ of FIG. 1. The voltage $V_{2A}$ produced by the start control device $15_A$ is supplied to a first selection device 16' while the voltage $V_{1A}$ produced by the proportional control circuit $13_A$ is applied to a second selection device 16''. The first selection device 16' receives both the voltage $V_{2A}$ and the source voltage $U_{max}$ from the voltage source 14. The selection device 16' selects the lesser of the two voltages $V_{2A}$ and $U_{max}$ and allows this voltage to pass through as $V_2$ to the second selection device 16''. In the second selection device 16'' the voltage $V_2$ is compared with voltage $V_{1A}$ from the proportional control circuit $13_A$; and the lesser of these voltages is allowed to pass through as voltage U to the motor 10. It will be appreciated that with this arrangement the motor 10 during the lower or starting speed range $0-N_1$ will receive the voltage $V_{2A}$ whereas in the intermediate speed range, $N_1-N_2$, it will receive the source voltage $U_{max}$; and finally in the speed control range $N_2-N_3$, it will receive the voltage $V_{1A}$.

It will also be appreciated that various different circuit arrangements may be provided for the proportional control device 13 or $13_A$, the start control devices 15 or $15_A$, or the selection devices 16, 16' and 16''.

The start control devices 15 and $15_A$ may include, for example, known diode wave shaping circuits approximating, in the starting period $0-N_1$, the voltage-speed characteristics of the control voltage U which adapts the speed-torque characteristics of the motor to its load. Certain of such circuit arrangements, which are especially advantageous, are illustrated in FIGS. 5-9. These circuits are especially advantageous since they actually integrate to a certain degree the various components 13, 15 and 16 and thereby permit a number of circuit elements to be dispensed with.

In the circuit arrangement of FIG. 5 the motor 10 drives the generator 12 as previously described in connection with FIGS. 3 and 4. The motor 10 is shown as a collector motor having a field coil 18 connected in series with its rotor 17. There are provided a pair of input terminals 19 and 20 which are arranged to receive a supply voltage from, for example, a 220-volt, 50-cycle source. At these input terminals two oppositely oriented thyristors $21_A$ and $21_B$ are separately connected in series with the rotor 17 and coil 18 of the motor 10. Between the control electrode of each of the thyristors $21_A$ and $21_B$ there is provided a transformer secondary winding $22_A$ and $22_B$ respectively of an ignition transformer 23.

In FIG. $5_A$ there are shown wave forms corresponding to several cycles of the supply voltage applied across the input terminals 19 and 20. The cross-hatch portions of each cycle corresponds to the durations in which one or the other of the thyristors $21_A$ and $21_B$ is conductive. This duration is indicated by the phase angle $\phi$.

There is additionally provided a full wave rectifier bridge circuit 14 having its two input terminals connected across the thyristors $21_A$ and $21_B$. The output terminals of the rectifier bridge 14 are connected via a resistor at 25 and a pair of conductors 26 and 27 to a zener diode 28. The zener diode 28 produces a reference voltage between the conductors 16 and 17 which is limited to a value of e.g., 18 volts.

FIG. $5_B$ illustrates in solid outline the variation of the reference voltage between conductors 26 and 27 during several half-cycles of the applied input voltage across the terminals 19 and 20. It will be appreciated that since upon ignition of one or the other of the thyristors $21_A$ or $21_B$ the voltage at the output of the bridge circuit 24 becomes zero, the reference voltage, i.e., "zener voltage" between the conductors 26 and 27 will exist only from the beginning of each half-wave period to the instant of thyristor ignition. In this manner, there is obtained a certain economy of power in the system.

A resistor 29 is connected across the conductors 26 and 27. In addition, there is provided a capacitor 30 which is connected on one side to the conductor 26 and on the other side to a junction between a resistor 31 and a diode 32 arranged in parallel and connected to the other conductor 27. The junction between the capacitor 30, the diode 32 and the resistor 31 is connected to the emitter of a first transistor 33. The collector of the first transistor 33 is connected via a resistor 34 to the base of a second transistor 35. The base of the first transistor 33 is connected via a resistor 36 to the conductor 26 and is also connected via a resistor 37 to a junction 38. The tachometer generator 12 is connected in parallel with a capacitor 39 and a resistor 40 between the conductor 27 and the junction 38. The junction 38 is also connected via a diode 41 and a resistor 42 to the base of the second transistor 35. The emitter of the second transistor 35 is directly connected to the conductor 26. The collector of the second transistor 35 is connected via a resistor 43 and a capacitor 45 to the conductor 27; and the junction between the resistor 43 and the capacitor 45 is connected to the emitter of a unijunction transistor 44. The upper base of the unijunction transistor 44 is connected directly to the conductor 26 while the lower base of the unijunction transistor 44 is connected via a primary winding 46 of the ignition transformer 23 to the conductor 27.

In operation of the system of FIG. 5, alternating voltages are applied across the input terminals 19 and 20. However, since the thyristors $21_A$ and $21_B$ are connected in series with the motor armature 17 and field winding 18, the motor will not be energized until one or the other of the thyristors ignites. Thyristor ignition occurs on the reception of an impulse in the associated transformer secondary windings $22_A$ and $22_B$. Upon the occurrence of such impulses, the particular thyristor arranged properly with respect to the sense of the applied voltage will be caused to fire and allow current to flow through the windings of the motor 10. This current will continue to flow until the end of the particular half-cycle of the supply voltage.

The firing of the thyristors $21_A$ and $21_B$ occurs as the result of the generation of the current impulse through the primary winding 46 of the transformer 23. This occurs when the voltage at the emitter of the unijunction transistor 44 becomes sufficiently positive to place the transistor 34 in its conductive condition. The emitter of the unijunction transistor 44 in turn is rendered positive whenever the second transistor 35 is made conductive. When this occurs, current flows downwardly from the conductor 26 through the emitter and collector of the second transistor 35 and through the resistor 43 to charge the capacitor 45. The sizes of the resistor 43 and the capacitor 45 are made quite small so that the voltage at the junction point between them increases rapidly upon the switching of the second transistor 35 to a conducting position.

The second transistor 35 is made conductive whenever the potential applied to its base is negative with respect to its emitter potential, i.e., whenever the voltage at the base becomes less than the zener voltage.

The voltage at the base of the second transistor 35 is controlled by the cooperative action of the tachometer generator 12 operating through the diode 41 and resistor 42 and the action of the first transistor 33 operating through the resistor 34. These elements, as will be explained more fully hereinafter, serve to control the current flow angle $\phi$ in such manner that the voltage applied to the motor 10 will follow a path corresponding to the path of $U_1$ in FIG. 1 for motor speeds in the starting range $0-N_1$; to follow a fixed voltage path corresponding to $U_{max}$ in the intermediate speed range $N_1-N_2$; and finally, to follow a rapidly decreasing path corresponding to $U_2$ in the control speed range $N_2-N_3$.

Because the second transistor 35 will conduct only when its base is more negative than its emitter, and because the tachometer generator 12 directs only positive voltages toward the base of the second transistor 35, this transistor will not be made conductive unless the first transistor 33 is conductive.

Operation of the first transistor 33 will now be discussed. At the end of each half-cycle, the zener voltage between the conductors 26 and 27 falls to zero and the capacitor 30 discharges via the resistor 29 and the diode 32. Thereafter, upon the initiation of the next half-cycle, the potential of the lower side of capacitor 30 is raised rapidly to full zener potential and then during the remainder of the half-cycle the capacitor 30 charges slowly via the resistor 31. Thus, the voltage applied to the emitter of the first transistor 33 rises rapidly at the beginning of each half-cycle and decreases slowly toward the end of the half-cycle. The transistor 33 becomes conductive whenever its emitter voltage drops below the voltage applied to its base. Thus, if a relatively high positive potential is applied to the base of the first transistor 33, then it will become conductive relatively early in each half-cycle since the potential at the emitter does not have to decrease by a great amount. However, where a relatively low potential is applied to the base of the first transistor 33, a greater length of time is required for the charge on the capacitor 30 to decrease by an amount sufficient to bring the emitter of the first transistor 33 to a potential below that of the base of the first transistor.

The potential at the base of the first transistor 33 is controlled by the output of the tachometer generator 12 which in turn is controlled by the speed of the motor 10. Thus, in considering the diagram of FIG. 1, the abscissa may be considered not only as representing motor speed N but also the tachometer generator output voltage E.

Where the tachometer output voltage E equals zero, then the base voltage applied to the first transistor 33 will be at its lowest possible value, since in this situation the voltage at the junction point 38 is zero and the voltage applied to the base of the first transistor 33 depends only upon the voltage at the junction of the voltage divider comprising the resistors 36 and 37. Thus, as the voltage across the load resistor 31 gradually diminishes, the emitter of the transistor 33 becomes negative relatively late in each half-cycle so that the thyristors $21_A$ and $21_B$ become conductive relatively late in their respective half-cycles. Consequently, the current flow angle is relatively small and the average motor voltage will have a low initial value $U_0$. If now, the motor speed increases and the output voltage E from the tachometer generator 12 increases, the base voltage at the first transistor 33 will become more positive and its emitter voltage will become negative with respect to its base at a point sooner in each half-cycle, thereby causing thyristor ignition to occur earlier in each half-cycle and correspondingly increasing the motor voltage U in accordance with the curve $U_1$ in FIG. 1.

Eventually, the motor speed increases to a point where the tachometer generator output voltage E corresponds to the speed $N_1$. At this point the voltage applied to the base of the first transistor 33 is such that the transistor will become conductive practically immediately after the voltage across the load resistor 31 begins to diminish. The current flow angle $\phi$ in this situation will have a maximum value of, for example, approximately 160°, this corresponding to the maximum motor voltage $U_{max}$. Thus, as motor speed varies, increases in the voltage output E from the tachometer generator 12 will have no influence upon the constant voltage output $U_{max}$.

When, however, the speed of the motor 10 exceeds the upper limit of the intermediate speed range $N_2$, the output voltage E from the tachometer generator 12 will approach the zener voltage $E_z$. In this situation, the voltage E would, except for the action of the first transistor 33, be applied via the diode 41 and the resistor 42 to the base of the second transistor 35, preventing it from ever conducting. However, in this speed range also, the first transistor 33 conducts during the major portion of each half-cycle. The conduction of the first transistor 33 causes current to flow through the resistors 34 and 42. The potential at the base of transistor 35 thereby depends on the potential of capacitor 30 as well as the potential of the voltage E. When the potential at capacitor 30 decreases during its charge to such an extent that the potential at the base of transistor 35 is lower than the potential of the emitter, transistor 35 will conduct. Now it will be appreciated that the higher the voltage E produced by the tachometer generator 12, the later in each cycle the voltage at the base of the second transistor 35 will drop to a point which will permit the transistor 35 to conduct. Accordingly, in the speed range $N_2-N_3$ the second transistor 35 will conduct later in each cycle as the motor speed and the tachometer output voltage E increases. As a result, the thyristors $21_A$ and $21_B$ will fire later and later during their respective half-cycles and the motor voltage U will follow the course $U_2$ in FIG. 1.

It will be appreciated from the above that the circuit arrangement of FIG. 5 will cause a voltage $U_1$ to be applied to the motor 10 during the starting and overload speed range $0-N_1$, a constant voltage $U_{max}$ during the intermediate speed range $N_1-N_2$, and finally, a linear yet highly responsive speed control voltage $U_2$ in the speed control range $N_2-N_3$.

The circuit arrangement of FIG. 5 is especially advantageous in that it requires a minimum of circuit components and is therefore especially suitable for the control of motor speed of motors which are to have a fixed predetermined desired speed of operation.

It will be noted in FIG. 5, that the input connections to the bridge circuit 14 include the field 18 and armature 17 circuits of the motor 10. This is an especially advantageous arrangement for it serves to ensure that at the instant one of the thyristors $21_A$ or $21_B$ ignites, the voltage drop between the input terminals 19 and 20 will occur across the motor 10 and the voltage across the thyristors, and across the input to the bridge circuit 14 will become zero. Consequently, no current will flow through the zener diode 28 and the other elements of the control circuits at the times that the motor 10 is receiving current. Accordingly, the system ensures a minimal power loss.

It is of course possible to operate the system without requiring that the motor 10 and the bridge circuit 14 be connected in series across the input terminals 19 and 20. In the modification illustrated in FIG. 6 the inputs to the bridge circuit 14 are connected directly to the input terminals 19 and 20. The armature 17 and field 18 of the motor 10, however, remain connected in series with the thyristors $21_A$ and $21_B$ as in the arrangement of FIG. 5. The arrangement of FIG. 6 operates similar to that of FIG. 5 with the exception that in the arrangement of FIG. 6, the voltage applied across the bridge circuit 14 and accordingly the voltage output of the circuit 14 does not return to zero immediately upon ignition of one of the thyristors $21_A$ or $21_B$, but rather, it rises and falls with the voltage applied to the input terminals 19 and 20.

Where the desired rotation speed of the motor $N_S$ is to be made adjustable or when the control range $N_2-N_3$ is to be made adjustable, then the circuit arrangement of FIG. 7 may be employed. In the arrangement of FIG. 7, a pair of input terminals 60 and 61 are connected to a voltage source (not shown) capable of supplying, for example, 220 volts at 60 cycles.

The input terminals 60 and 61 are connected to a full wave rectifier bridge 62; and the output terminals of this rectifier bridge are connected across a thyristor 63 and the motor 10 arranged in series. A secondary winding 64 of an ignition transformer 65 is connected between the gate and cathode terminals of the thyristor 63.

Also across the output terminals of the rectifier bridge 62 there is provided a resistor 47 and a zener diode 48 connected in series. A pair of conductors 49 and 50 are connected across the zener diode 48; and a zener voltage $E_Z$, indicated by the wave form of FIG. $6_A$, is provided across these conductors. A primary winding 66 of the ignition transformer 65 is connected in series with a unijunction transistor 51 and a resistor 52 across the conductors 49 and 50. The thyristor 63 will fire and allow current to flow through the motor 10 whenever the secondary of the ignition transformer 65 receives an impulse through its primary winding 46. This takes place whenever the emitter of the unijunction transistor 51 becomes sufficiently positive to allow the transistor to conduct.

An ignition capacitor 53 and an adjustable resistor 54 are connected in series across the conductors 49 and 50; and a junction point 59 between these two elements is connected to the emitter of the unijunction transistor 51. There is additionally provided a voltage divider comprising a fixed resistor 55 and an adjustable resistor 56 connected between the conductor 50 and a negative terminal $12_a$ of the tachometer generator 12. The positive terminal $12_b$ of the tachometer generator 12 is connected to the other conductor 50. The junction between the fixed and adjustable resistors 55 and 56, identified as a voltage dividing point 57, is connected via a diode 58 to the junction point 59 between the adjustable resistor 54 and the ignition capacitor 53.

The portion of the circuit of FIG. 7 thus far described, i.e., the portion comprising the voltage divider elements 55 and 56, the ignition capacitor 53, the adjustable resistor 54, the unijunction transistor 51 and the ignition transformer 65, operates similarly to the control system shown and described in copending U. S. application Ser. No. 674,580, filed Oct. 11, 1967, when the motor 10 is operating in the control speed range $N_2-N_3$. In the present case, however, these circuit elements cooperate with additional circuit elements to be described in order to provide additional improved regulation of the motor voltage in the start and overload speed range, $0-N_1$. This additional regulation is based upon the voltage E produced by the tachometer generator 12. As shown in FIG. 7, there is provided a transistor 70 whose collector is connected to the junction 59 and whose base is connected via a resistor 71 and a zener diode 72 to a junction 73. The emitter of the transistor 70 is connected directly to the conductor 49. A resistor 74 and a diode 75 are connected in parallel between the conductor 49 and the junction 73. In addition, there is also provided a capacitor 76 and a diode 78 connected in series between the junction 53 and the conductor 50.

There is additionally provided a second transistor 77 whose emitter is connected to the junction between the capacitor 76 and the diode 78 and whose emitter is connected directly to the conductor 49. The base of the second transistor 77 is connected via a resistor 79 to the conductor 49. The base of the second transistor 77 is also connected via another resistor 80 to the negative terminal $12_a$ of the tachometer generator 12. Finally, there is provided an additional resistor 81 connected directly across the conductors 49 and 50.

During operation of the system of FIG. 7, the transistor 70 remains non-conductive and therefore does not influence the operation of the other regulating elements in the high, or controlled, speed range $N_2-N_3$. During this high speed operation, motor speed regulation is achieved by the remaining elements, i.e., the ignition capacitor 53, the adjustable resistor 54 and the voltage divider arrangement comprising the resistor 55 and the adjustable resistor 56 operating in conjunction with the tachometer generator 12.

At the beginning of each half-wave period of the 220-volt supply across the input terminals 60 and 61, the ignition capacitor 53 becomes charged rapidly by the voltage appearing at the junction 57 between the fixed and adjustable resistors 55 and 56. This voltage is equal to the sum of the zener voltage $E_Z$ and the tachometer voltage E. This suddenly appearing voltage across the ignition capacitor 53 is known as the "leap voltage." Following the imposition of this "leap voltage" across the ignition capacitor 53, there is superimposed thereon a slowly incrasing "ramp voltage." This "ramp voltage" is produced by curent flowing to the capacitor 53 via the adjustable resistor 54.

When the voltage across the ignition capacitor 53 (i.e., the voltage at the junction 59) reaches the ignition voltage of the unijunction transistor 51, then the transistor begins to conduct and the ignition capacitor 53 becomes discharged via the primary winding 46 of the ignition transformer 65; and the thyristor 21 becomes triggered via the secondary winding 64. It will be appreciated that the larger the tachometer generator voltage E becomes, the lower will be the voltage at the junction 57 with respect to the conductor 49. Thus, the "leap voltage" becomes smaller and the voltage across the ignition capacitor 53 will reach a transistor firing level at a correspondingly later time during the half-wave period. As a result, the voltage applied to the motor 10 will follow the path indicated for $U_2$ in FIG. 1. Depending upon the adjustment of the resistor 56, at a certain value of the tachometer generator voltage E, the ignition point for the unijunction transistor 51 will be reached by the "leap voltage" itself. This corresponds to the maximum value of the current flow angle $\phi$, and provides the constant maximum voltage applied to the motor $U_{max}$ as illustrated in FIG. 1. By proper adjustment of the resistor 56, the rotational speed $N_2$ and accordingly the speed control range itself $N_2$–$N_3$ can be varied.

At the end of each half-cycle of the applied voltage across the input terminals 60 and 61, the capacitor 76 becomes discharged via the diodes 75 and 78 and the resistor 81. At the beginning of each half-cycle, the capacitor 76 becomes charged via the transistor 77. The transistor 77 operates to charge the capacitor 76 whever its base potential exceeds that of its emitter. This base potential depends upon the relative resistance values of the resistors 79 and 80 as well as upon the voltage E produced by the tachometer generator 12.

The potential of capacitor 76 thus initially is raised rapidly with a corresponding increase in current through the resistor 74 and a rapid rise in the voltage level at the junction 73. Thereafter, however, the capacitor 76 charges slowly and the voltage at the junction point 73 diminishes gradually.

In the situation where motor speed N equals zero, and the voltage E produced by the tachometer generator 12 also equals zero, the voltage at the base of the second transistor 77 will be the greatest and the capacitor 76 will charge most rapidly. Accordingly, the voltage at the junction 73 will remain at a high level for a relatively long period of time. This voltage, as long as it exceeds to breakdown voltage of the zener diode 72, will permit current to flow to the base of the first transistor 70, thereby allowing it to conduct. This conduction of the first transistor 70 operates to decrease the voltage at the junction 59 thereby preventing the discharging of the ignition capacitor 53. When, however, the voltage at the junction 73 falls below the breakdown voltage of the zener diode 62, the transistor 70 is rendered non-conductive and the voltage existing at the junction 57 will result in a loading of the capacitor 53 with the high "leap voltage" thereby permitting immediate triggering of the unijunction transistor 51 and consequently of the thyristor 63. The current flow angle $\phi$ in such case is relatively small, as is the motor voltage $U_0$. It will be appreciated that the value of the current flow angle $\phi$ is dependent upon the selected value of the resistor 74.

As the speed of the motor 10 increases, the voltage E produced by the tachometer generator 12 also increases. This results in a lowering of the potential at the base of the second transistor 77 thereby restricting the flow of charging current to the capacitor 76 with the result that the voltage at the junction 73 will decrease below the breakdown voltage of the zener diode 72 at an earlier point in the cycle. Thus, the first transistor 70 is rendered non-conductive at an earlier point in the cycle so that the current flow angle $\phi$, and consequently the motor voltage U becomes larger in accordance with the path of $U_1$ in FIG. 1.

The circuit arrangement of FIG. 7 follows the functional relationship of elements indicated in the diagram of FIG. 3; and, as such, the transistor 70, the resistor 71 and the zener diode 72 serve as the voltage selection device 16 of FIG. 3. The circuit elements 71–79 of FIG. 7 serve as the proportional control device 13 and the circuit elements 53–59 in FIG. 7 function as the start control device 15 of FIG. 3.

In the arrangement of FIG. 8, the motor 10 receives electrical power from a pair of input terminals 90 and 91; such power being duty-cycle- controlled and rectified by means of a pair of thyristors $92_a$ and $92_b$. The thyristors $92_a$ and $92_b$ are ignited or fired by means of voltage impulses received from transformer secondary coils $93_a$ and $93_b$ connected respectively between their gate electrodes and their cathodes. The motor 10 drives the tachometer generator 12 as described in connection with the preceeding embodiments; and the voltage output E of the tachometer 12 is applied to both a start control circuit 94 and to a prportional control circuit 95. These circuits operate to produce output pulses to achieve current flow angle control in different regions of the motor speed range. The pulses produced by the start control circuit and the proportional control circuit 94 and 95 are applied to primary windings 96 and 97 of a common input transformer 98 has a single secondary winding 99 which is connected to a two-count counter 100. The counter 100 produces a single pulse across an output winding 101 forming the primary of the output transformer 94 upon the occurrence of every second pulse across the input coil 99.

In operation of the circuit of FIG. 8, the start control circuit 94 and the proportional control circuit 95 will produce pulses at a different times during each input wave cycle. Since the latter of the two pulses produced by these circuits represents a smaller current flow angle, (i.e., a lower voltage to be applied to the motor 10), only this second pulse will cause the two-count counter 100 to produce an output pulse on the coil 101 to ignite one or the other of the thyristors $92_a$ and $92_b$. There is thus provided a voltage selection arrangement wherein the smaller of the voltages to be produced by the start control circuit 94 and the proportional control circuit 95.

Figure 9:
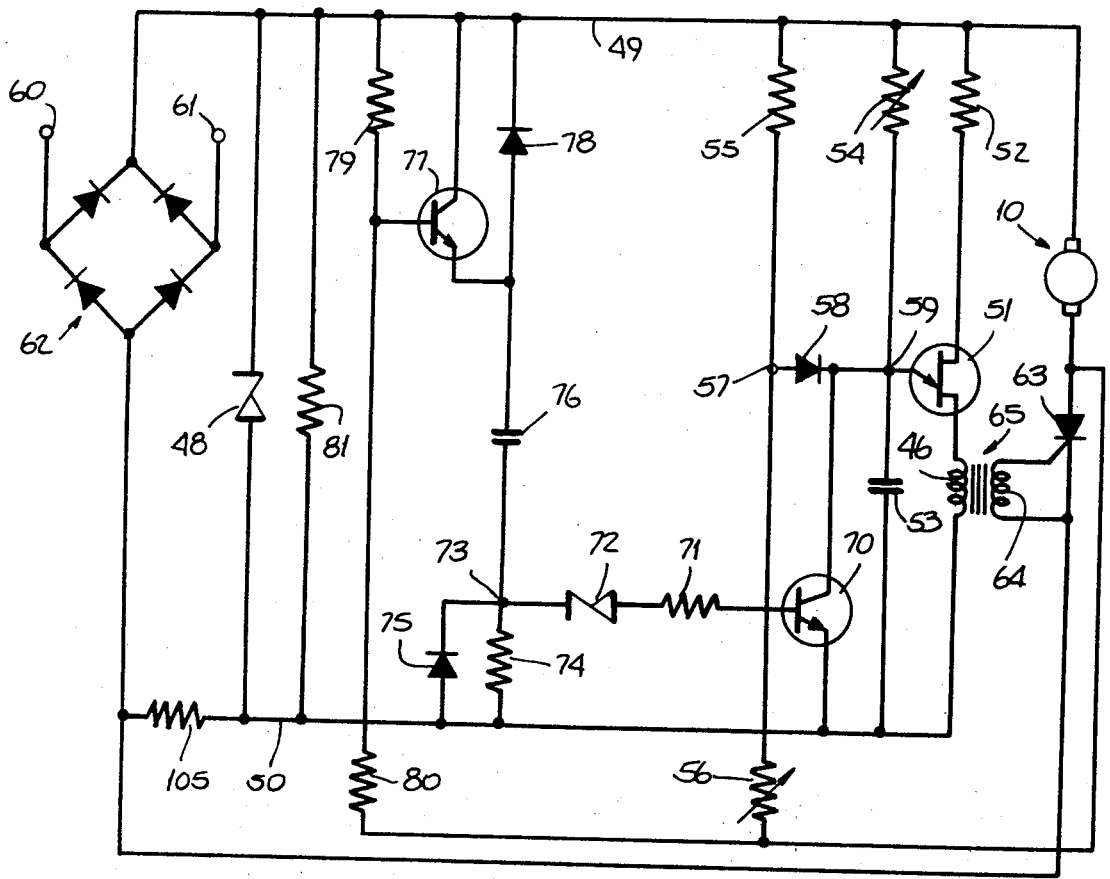
FIG. 9 is a circuit diagram illustrating a still further modification of the present invention.
Figure 6:
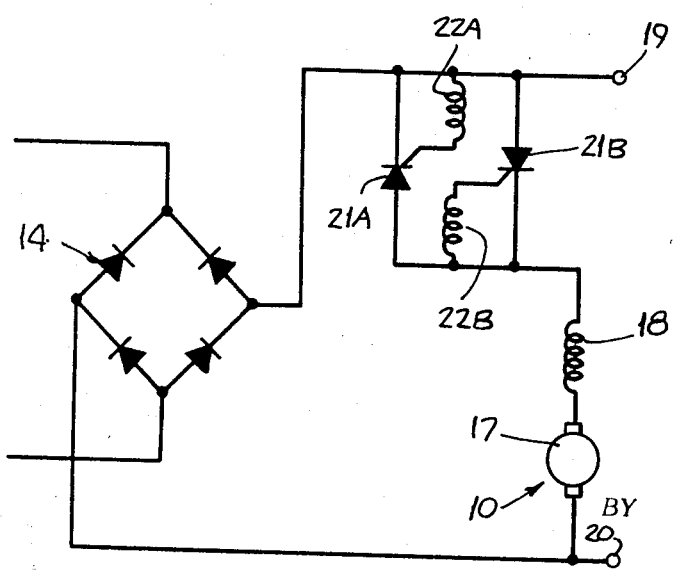
FIG. 6 is a partial circuit diagram showing a modification of a portion of the circuit of FIG. 5.

It will be appreciated that it is not necessary that the signal representative of motor speed correspond precisely to the actual motor speed in order to effect control in accordance with the principles of the present invention. In fact, in some instances, it may be possible to dispense altogether with the tachometer generator 12 and utilize the counter-EMF produced by the motor armature during the time it is not actually receiving electrical power. The arrangement shown in FIG. 9 utilizes this counter-EMF produced by the motor 10. The arrangement of FIG. 9 is similar to that of FIG. 7 with the exception that the conductor 49 is connected directly to the positive output side of the bridge circuit 62 while the conductor 50 is connected via a resistor 105 to the negative side of the bridge circuit 62. In addition, the thyristor 63 is connected to the negative side of the bridge circuit 62 while the motor 10 is connected on the anode side of the thyristor 63. The resistors 80 and 56 are connected to a point between the thyristor 63 and the motor 10.

It will be appreciated that the control portion of the circuit of FIG. 9 is referenced more closely to the positive side of the bridge circuit 62, whereas in FIG. 7 the control portion of the circuit is referenced more closely to the negative side of the bridge circuit 62. In the arrangement of FIG. 9, during the intervals when the thyristor 63 is in its non-conducting condition, no current is being fed to the motor 10 and a counter-EMF is generated across its terminals. The positive side of this counter-EMF is applied via the conductor 49 to the various elements of the control portion of the circuit. The negative side of the motor 10, i.e., the junction between the motor 10 and the thyristor 63, is coupled to the resistors 80 and 56, thereby providing a voltage corresponding to the voltage E produced by the tachometer generator 12 of the circuit of FIG. 7.

What is claimed and desired to be secured by Letters Patent is:

1. A circuit arrangement for controlling in a controlled speed range, the rotational speed of an electric motor of a type whose rotational speed is dependent upon the magnitude of an applied voltage and adapting said motor in a starting speed range to a load having a variable speed-torque requirement, a source of voltage for driving said motor, said circuit arrangement comprising means for producing a first control voltage corresponding to the rotational speed of said motor and control means connected with said source of voltage for applying a second control voltage to said motor in response to said first control voltage, said control means including start control circuit means connected to said means for producing a first control voltage, said start control circuit means being operable in said starting speed range for establishing said second control voltage at values for causing said motor to adapt to a preselected variable speed-torque requirement, and a proportional control circuit connected to said means for producing a first control voltage, said proportional control circuit being operable in said controlled speed range to establish said second control voltage at values proportional to the speed of said motor, and selection means for controlling said second control voltage responsive to outputs from said start control circuit when operating in said starting speed range and responsive to outputs from said proportional control circuit when operating in said controlled speed range.

2. A circuit arrangement as in claim 1, wherein said starting speed range and said controlled speed range are separated by an intermediate speed range and said control means includes circuit means, operable in said intermediate speed range, for establishing said second control voltage at a constant voltage.

3. A circuit arrangement as in claim 1, wherein said starting speed range and said controlled speed range are separated by an intermediate speed range, wherein said start control circuit means includes third means for providing a third control voltage having in said starting speed range voltage-speed characteristics corresponding to said variable speed-torque requirements of said load and a constant maximum value in said intermediate and controlled speed ranges, wherein said proportional speed control circuit means includes fourth means for providing a fourth control voltage having in said controlled speed range values proportional to the speed of said motor and said constant maximum value in said intermediate and starting speed ranges, and wherein said control means further includes selection means for selecting the smaller of said third and fourth control voltages to provide said second control voltage for application to said motor.

4. A circuit arrangement according to claim 3, wherein there is provided a thyristor in circuit with said motor for obtaining phase split control of an AC voltage applied to the motor and wherein said second control voltage is coupled to the gate of said thyristor.

5. A circuit arrangement according to claim 3, wherein said selection means includes means for adjusting said speed ranges.

6. A circuit arrangement for the control of the rotational speed of an electric motor of a type whose rotational speed is dependent upon the magnitude of an applied voltage, said circuit arrangement comprising thyristor means having gating means in circuit with said motor to obtain phase split control of voltages applied to said motor, a zener diode arranged to maintain a zener voltage from an alternating current source, an ignition capacitor connected in series with the emitter-collector path of a first transistor across said zener diode, trigger means coupled between said ignition capacitor and said thyristor for triggering said thyristor in response to a predetermined voltage across said ignition capacitor, means for generating a control voltage which varies in accordance with the speed of said motor, means including a resistor and a diode connected to apply said control voltage to directly influence the base voltage of said first transistor when the control voltage exceeds the zener voltage, a further capacitor and a further resistor connected in series across said zener diode, a second transistor, and means connecting said second transistor such that it is rendered capable of conducting when a voltage drop of given magnitude exists across said further resistor, a diode connected in parallel with said further resistor, a discharge resistor connected across said zener diode, means connecting said second transistor to influence the base voltage of said first transistor during conduction of said second transistor, the base of said second transistor being connected to receive said control voltage, whereby in the lower speed range said second transistor becomes conductive earlier in each cycle of an applied alternating supply voltage upon the reception at its base of an increasing control voltage to become conductive and render said first transistor conductive and obtain firing of said thyristor means in a manner increasing the current flow angle thereof and wherein upon the occurrence of control voltages in excess of said zener voltage the first transistor is rendered conductive at later times in each cycle of applied alternating supply voltage by the combined direct effects of the control voltage and indirect effects thereof operating via said second transistor.

7. A circuit arrangement according to claim 6, wherein there is provided a full wave rectifier bridge, said zener diode being connected across the output of said rectifier bridge, the input of said bridge being connected in parallel relationship with a pair of parallel connected thyristor means, forming said thristor means, said thyristors being arranged to conduct in mutually opposite directions, said thyristors being arranged in series with said motor between a pair of input terminals whereby current will cease to flow through said zener diode in that portion of each alternating wave cycle following ignition of one of said thyristors.

8. A circuit for controlling the speed of an electric motor of the type whose speed corresponds to the magnitude of an input voltage, said circuit comprising means for producing control signals corresponding to the rotational speed of said motor and control circuit means for adjusting the input voltage to said motor in direct proportion to said control voltage in a lower motor speed and in inverse proportion to said control voltage in a higher speed range, said control circuit means comprising a proportional control circuit, a start control circuit and a selection device, said proportional control circuit and said start control circuit each being connected to receive and respond to said control signals, said proportional control circuit including means for producing outputs directing a maximum voltage to be applied to said motor in response to control signals corresponding to motor speeds up to the beginning of a speed control range and means for producing outputs directing a decreasing voltage to be applied to said motor in response to control signals corresponding to increasing motor speeds in said speed control range, said start control circuit including means for producing outputs directing an increasing voltage to be applied to said motor in response to control signals corresponding to increasing motor speeds in a low speed start and overload motor speed range and means for producing outputs directing said maximum voltage to be applied to said motor in response to control signals corresponding to motor speeds above said low speed start and overload motor speed range, said selection device including switch means operative in response to outputs from said start control circuit and said proportional control circuit to apply the lower directed voltage to said motor.

9. A circuit arrangement according to claim 8, wherein said selection device includes a thyristor connected in series with said motor to provide voltage control to the motor by means of phase splitting, wherein each of said proportional control and said start control circuits are constructed to produce ignition impulses in the course of each applied voltage cycle, and wherein the selection device further includes circuit means operative to fire said thyristor arrangement only in response to the occurrence of the second of said ignition impulses produced in each cycle.

10. A circuit arrangement according to claim 8, wherein said switch means for applying the lower directed voltage to said motor comprises a thyristor in circuit with said motor for obtaining phase split control of the voltage applied to the motor, wherein said proportional control circuit operates to control the ignition of said thyristor, and wherein said selection device further includes means connected between said start control circuit and said proportional control circuit in a manner such that said start control circuit influences the operation of said proportional control circuit in the lower speed range.

11. A circuit arrangement according to claim 10, wherein said selection means includes means for adjusting said speed ranges.

12. A circuit according to claim 8, wherein there are provided means for supplying a maximum voltage to said motor, said start control circuit and said proportional control circuit being arranged to produce voltages less than said maximum voltage in said low speed start and overload speed range and in said speed control ranges, respectively, said selection device comprising a first and second selecting portion, said first selection portion being connected to receive said maximum voltage and the voltage output of one of said start control and proportional control circuits and to apply the lower of the two as a first selected voltage to the second selecting portion, said second selecting portion being connected to receive said first selected voltage and the voltage output from the other of said start control and proportional control circuits and to apply the lower of the two as a second selected voltage to said motor.

* * * * *